US 8,364,760 B2

(12) United States Patent
Desai et al.

(10) Patent No.: US 8,364,760 B2
(45) Date of Patent: *Jan. 29, 2013

(54) CALENDAR INTERFACE FOR DIGITAL COMMUNICATIONS

(75) Inventors: Snehal Desai, Richardson, TX (US); Jack Jachner, Plano, TX (US); Atiya Suhail, Plano, TX (US); Kashipati G. Rao, Plano, TX (US)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/275,506

(22) Filed: Oct. 18, 2011

(65) Prior Publication Data

US 2012/0042014 A1    Feb. 16, 2012

Related U.S. Application Data

(63) Continuation of application No. 11/290,164, filed on Nov. 30, 2005, now Pat. No. 8,055,707.

(51) Int. Cl.
*G06F 15/16*  (2006.01)

(52) U.S. Cl. ..................................................... 709/204
(58) Field of Classification Search ................. 709/204
See application file for complete search history.

(56) References Cited

U.S. PATENT DOCUMENTS

| 6,175,860 | B1 * | 1/2001 | Gaucher ....................... 709/208 |
| 7,454,462 | B2 * | 11/2008 | Belfiore et al. ................ 709/203 |
| 7,904,058 | B2 * | 3/2011 | Rastas ......................... 455/412.1 |
| 8,055,707 | B2 * | 11/2011 | Desai et al. .................... 709/204 |
| 2002/0078070 | A1 * | 6/2002 | Eshelman et al. ............ 707/200 |
| 2004/0203643 | A1 * | 10/2004 | Bhogal et al. .............. 455/414.1 |
| 2004/0243677 | A1 * | 12/2004 | Curbow et al. ............... 709/206 |
| 2006/0135128 | A1 * | 6/2006 | Skoog ........................ 455/412.1 |

* cited by examiner

*Primary Examiner* — Larry Donaghue
(74) *Attorney, Agent, or Firm* — Garlick & Markison; Jessica W. Smith (57) ABSTRACT

Information from communications is displayed in a calendar format. Text from the communications is used to determine whether a scheduling entry should be created. If so, text from the communication is used to create a proposed calendar or to-do list entry, which can be saved, modified or canceled by the user. Information from a call log can be filtered and displayed in a calendar format.

20 Claims, 7 Drawing Sheets

November 2004

| S | M | T | W | T | F | S | Buddies |
|---|---|---|---|---|---|---|---------|
|   |   |   |   |   |   |   | OTUC    |
|   |   |   |   |   |   |   | Emmanuel |
|   | 1 | 2 | 3 | 4 | 5 | 6 | Patrick |
|   |   |   |   |   |   |   | Jason   |
| 7 | 8 | 9 | 10 | 11 | 12 | 13 | Jack |
|   |   |   |   |   |   |   | Mike    |
| 14 | 15 | 16 | 17 | 18 | 19 | 20 | • |
|   |   |   |   |   |   |   | • |
| 21 | 22 | 23 | 24 | 25 | 26 | 27 |   |
|   |   |   |   |   |   |   |   |
| 28 | 29 | 30 |   |   |   |   |   |

| All Comm |
|----------|
| Call Log |
| IM Log |
| Missed Calls |
| E-mail Log |
| • |
| • |
| • |

*Fig. 3b*

November 2004       Jason (Missed Calls)

| S | M | T | W | T | F | S | Buddies |
|---|---|---|---|---|---|---|---------|
|   |   | Good game |   | Meeting tomorrow |   |   |   |
|   | 1 | 2 | 3 | 4 | 5 | 6 |   |
|   | Can't make it |   |   | Purchase Reqs |   |   |   |
| 7 | 8 | 9 | 10 | 11 | 12 | 13 |   |
|   |   |   | Purchase Reqs |   |   |   |   |
| 14 | 15 | 16 | 17 | 18 | 19 | 20 |   |
|   |   | Purchase Reqs |   |   |   |   |   |
| 21 | 22 | 23 | 24 | 25 | 26 | 27 |   |
| 28 | 29 | 30 |   |   |   |   |   |

CALENDAR INTERFACE FOR DIGITAL COMMUNICATIONS

CROSS-REFERENCE TO RELATED APPLICATIONS

Continuation Priority Claim, 35 U.S.C. §120

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:
1. U.S. Utility patent application Ser. No. 11/290,164, entitled "Calendar Interface for Digital Communications," filed Nov. 30, 2005, pending.

BACKGROUND OF THE INVENTION

1. Technical Field

This invention relates in general to electronic communications and, more particularly, to a calendar interface to multiple communication streams.

2. Description of the Related Art

For many years, the vast majority of communications were either voice communications over the telephone or written communications sent by mail. Over the last decade, the options for communication have increased dramatically. Now, telephonic communications are provided not only by wireline connections, but also through wireless telephone and IP (Internet protocol) telephones, also referred to as packet phones or VOIP (voice over IP) telephones, which communicate over a network, such as the Internet. IP telephones include, for example, standalone dedicated units, ATAs (analog telephone adapters, which perform the necessary translation to adapt a standard analog phone for VOIP communications), and "soft" phones that are executed on a computing device, such as a computer or personal digital assistant (PDA). In addition, electronic mail (email) and instant messaging has largely replaced mail as the main form of written communication. In addition to written communications, messaging applications often provide voice and visual communication between two or more parties. A single computer could be simultaneously executing an email application, a VOIP telephone application, and multiple instant messaging windows (or a single application that unifies multiple communication types).

Accordingly, a person may be receiving information from a number of sources—cell phone, wireline phone, IP phone, email and instant messaging. This can result in a data overload, making it difficult for a user to organize the information and to docket events based on the information.

Therefore, a need has arisen for an improved method and apparatus for interfacing with various digital communication sources.

BRIEF SUMMARY OF THE INVENTION

In a first embodiment, the present invention provides for organizing data associated with communications. An electronic database including information regarding communication interactions between a user and other parties is maintained, wherein the database includes a date for each communication interaction. A user processing device displays all or a selected portion of the communication interactions in a calendar format according to said date.

This aspect of the invention provides a superior interface for displaying information regarding communication interactions, such as received calls, missed calls, placed calls, email messages, text/instant messages and so on. The displayed information may be filtered to provide more insight as to the nature of various communications. The filters provide the additional advantage of downloading only specific communication log entries from the database on the server, thereby enabling less-capable terminals (such as PDAs, cell phones, and other communicating devices, such as the RIM Blackberry) to work efficiently. In the preferred embodiment, the user can interact with the displayed information such that a single click will generate a context-populated communication session. This aspect of the invention greatly increases user efficiency and eliminates or greatly reduces drudgery in reading communication logs.

In a second embodiment, the invention provides for generating entries for a scheduling program. Information from a communication between two or more parties is parsed to determine whether the communication involves a scheduling event. If a scheduling event is detected, a proposed entry for the scheduling program including information derived from the communication is generated.

This aspect of the invention increases user productivity and eliminates or greatly reduces inadvertent non-entry of events.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-10 of the drawings, like numerals being used for like elements of the various drawings.

Figure 1:
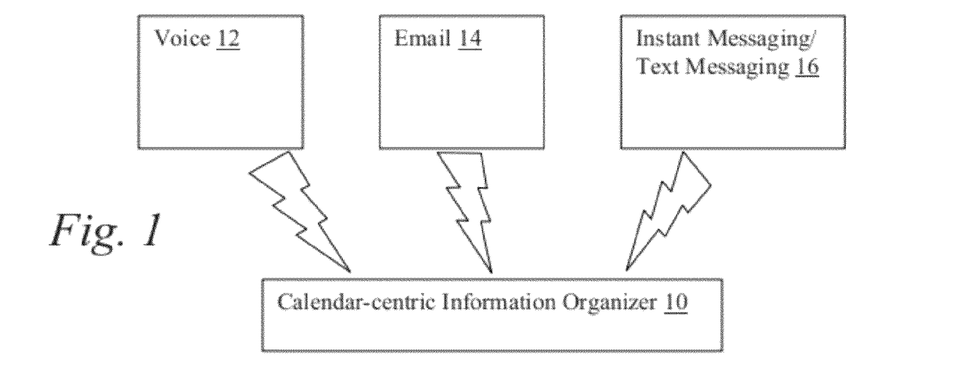
FIG. 1 illustrates a basic block diagram of a Calendar-centric Information Organizer communicating with various sources of communication.

FIG. 1 illustrates a basic block diagram of the present invention. A Calendar-centric Information Organizer 10 communicates with various sources of communication—voice sources 12, such as VOIP (voice over internet protocol) communications, email sources 14, and instant messaging/text messaging sources 16. Information regarding communications with the sources, and any other communication source that can be tracked, is organized in calendar form by the Calendar-centric Information Organizer 10 in a calendar format, shown in greater detail hereinbelow.

In operation, the Calendar-centric Information Organizer 10 is a program which can be executed on a processing device, such as a desktop computer, mobile computer, personal digital assistant (PDA), mobile phone, smart phone, and so on. The various communication sources 12-16 are monitored by the Calendar-centric Information Organizer 10, which organizes information regarding communications on the sources 12-16. The ways in which this information is organized depends on the type and content of the information.

Figure 2:
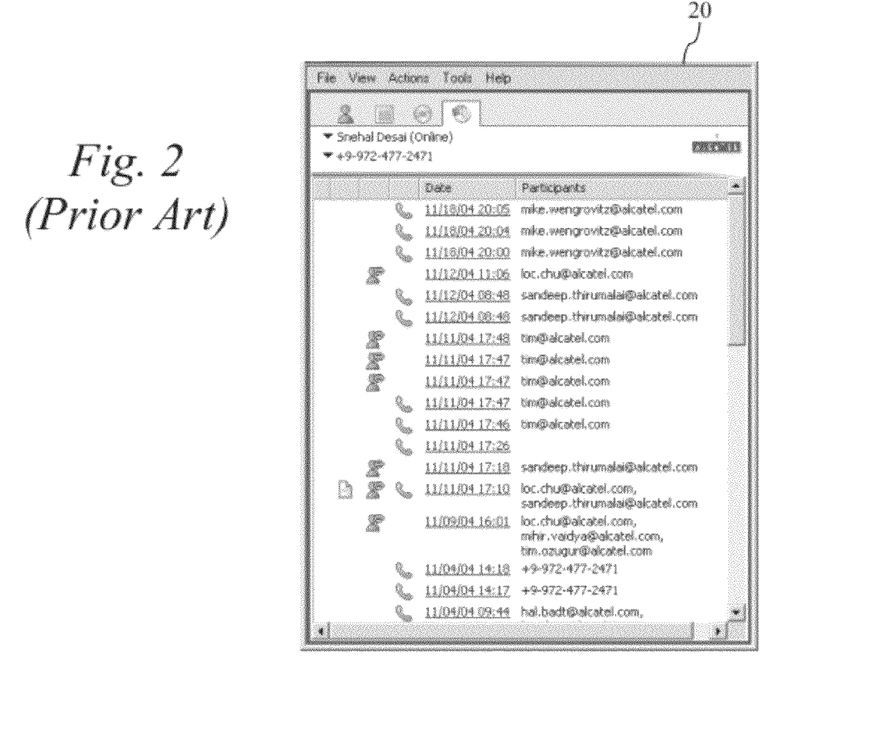
FIG. 2 illustrates a typical prior art message log.

FIG. 2 illustrates a typical prior art message log 20. In the illustrated embodiment, the message log 20 is a unified log showing communication from multiple sources, such as telephone calls, instant/text messages and email messages (a single communication could involve multiple sources, such as a communication involving both voice and instant messaging). For each message, a date and time are shown, along with the parties to the communication. Typically, the list of communications can be sorted on multiple fields, such as date/time or participants. The log 20 could also provide information on whether the attempted communication was completed or not, and identify the party that initiated the communication (i.e., was the user the calling party or the called party for a phone communication). Also, the log might include a subject line (entered by the calling party) which describes the purpose of the communication.

Although the log 20 provides information on certain aspects of a communication as described above, it is difficult to extrapolate additional information that is not explicitly provided in the log 20. For example, a customer may call every Thursday between 10 AM and 11 AM. The user may find this information important, so that he can be near his desk when the call is made. Call pattern information is almost impossible to derive from the list shown in FIG. 2, however.

Figure 3A:
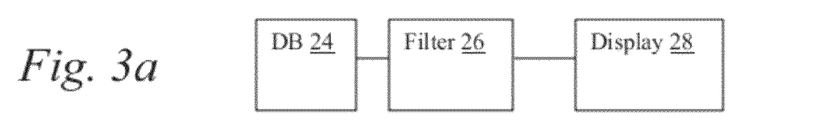
FIG. 3a illustrates a block diagram of a Calendar-centric Information Organizer.
Figure 3B:
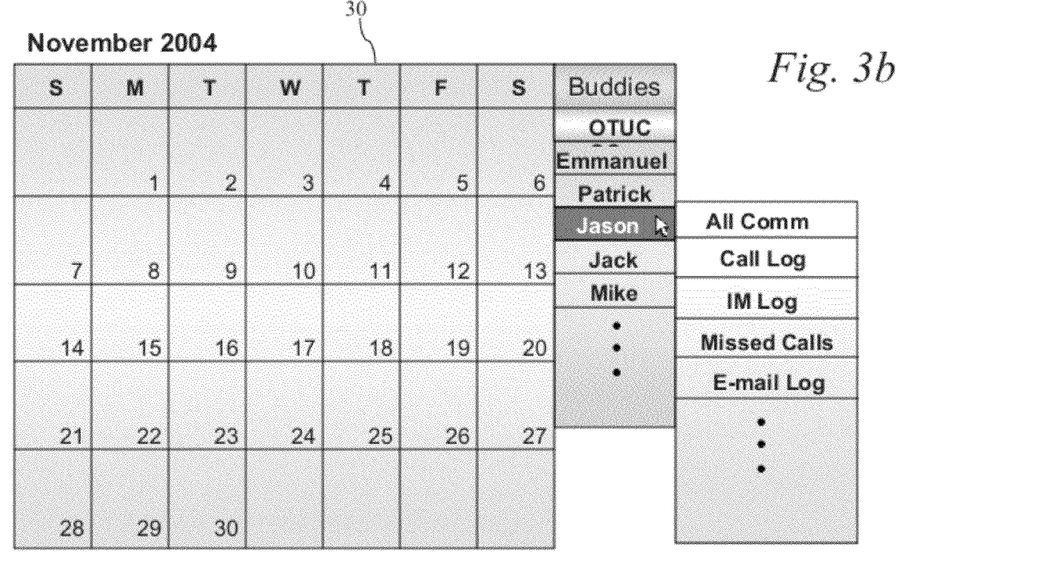
FIGS. 3b through 3c illustrate an embodiment of the invention where call logs are formatted in a calendar arrangement.
Figure 3C:
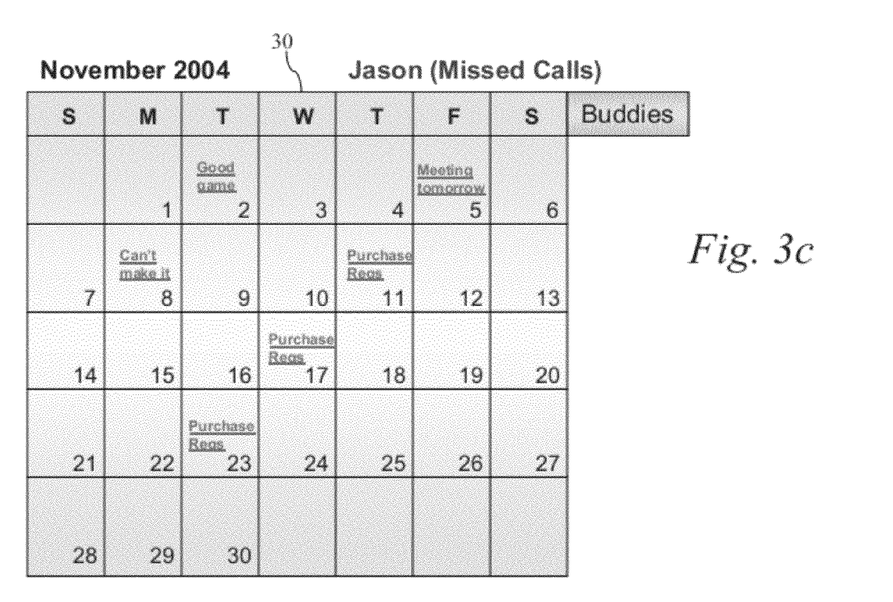

FIGS. 3a through 3c illustrate an embodiment of the invention where call logs are formatted in a calendar arrangement. In this embodiment, information regarding various communications is organized in a familiar calendar format (or multiple formats) with the addition of filtering (in this case, a "buddy list").

FIG. 3a illustrates a basic block diagram of this embodiment. A database 24 stores information on communications between users. Filter software 26 is defined by the user to select all or a portion of the communications between the user and other parties from the information in database 24. Display software 28 generates a display (see FIGS. 3b and 3c, below) which displays the filtered data in a calendar format.

In operation, the database 24 is typically stored in a server somewhere on a network (not shown) to which the Calendar-centric Information Organizer 10 is in communication. Typically, the Calendar-centric Information Organizer 10 communicates with the database 24 over the Internet, or other publicly available network; however, the database 24 could be stored on a private network or on the user's processing device.

In FIG. 3b, a blank monthly calendar is shown, with the user selecting "Jason" from a list of buddies. Beyond selecting a specific party to a communication, the user can select the type of communication—i.e., all communications, voice calls only, instant messages only, missed voice calls, email messages only, and so on.

In FIG. 3c, information is displayed for missed calls from Jason. The subject line of the missed calls is shown in the box for the date on which the communication, or attempted communication, occurred.

Figure 4:
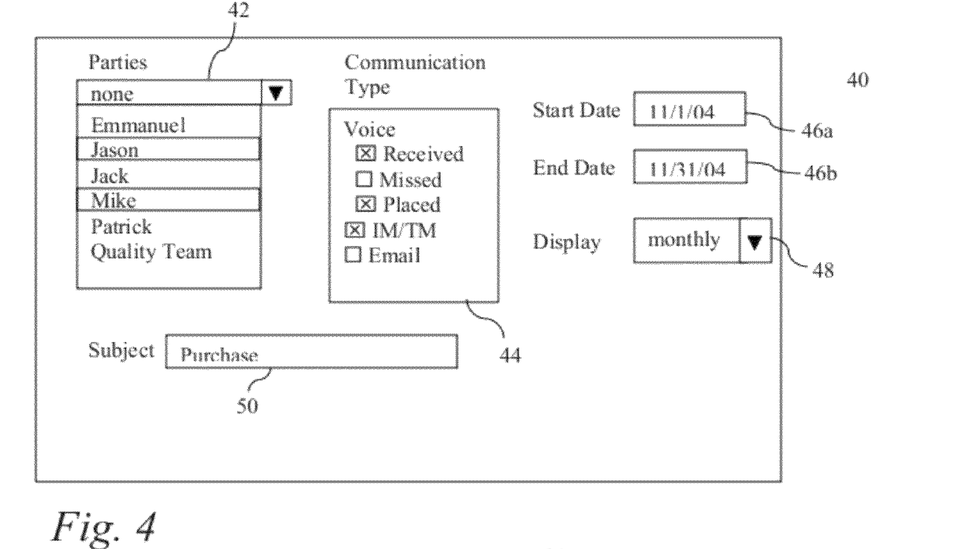
FIG. 4 illustrates a filter screen for specifying filtering criteria to be applied to the communication information for display in a calendar format.

FIG. 4 illustrates an alternative filter screen 40 for specifying filtering criteria to be applied to the communication information for display in a calendar format. A "Parties" drop-down box 42 provides a list of parties with which the user has had communications, or attempted communications (alternatively, the drop-down box could have a subset or subsets of this information, such as personal contacts, work contacts, medical, and so on). The parties may include groups, such as "Quality Team", that could include multiple related individuals. The user may select one or more parties from the drop-down box 42.

A Communication Type box 44 allows the user to select the types of communications that are to be displayed. The communication types listed in FIG. 4 include received voice communications, missed voice communications, placed voice communications, instant/text messages and email. Additional communication types could be added to box 44 as appropriate—such as video messages and so on.

Start and End date fields 46a and 46b allow the user to specify a date range for the communications. Display drop-down box 48 allows the user to specify the format of the display: daily, weekly, monthly, yearly and so on. Subject field 50 allows the user to specify keywords from the subject line of a communication.

The embodiment of the invention provided above provides a more structured view of prior communications which enables the user to derive non-explicit information from viewing the information in a calendar output form. This embodiment could be a stand-alone program, or incorporated with other scheduling programs with a calendar format, such as MICROSOFT OUTLOOK. By filtering the information from the database 24 at the server, rather at the user device, only the information related to the desired communication log entries is communicated from the server to the user device, enabling all types of terminals (including less capable terminals) to run the application efficiently. This is also a critical advantage for the database server, because it frees the server from sending huge downloads when only a specific subset is desired. Additionally, having prior communication sessions organized in a calendar view allows the user to easily plan future communication sessions vis-à-vis his or her own schedule.

Figure 5:
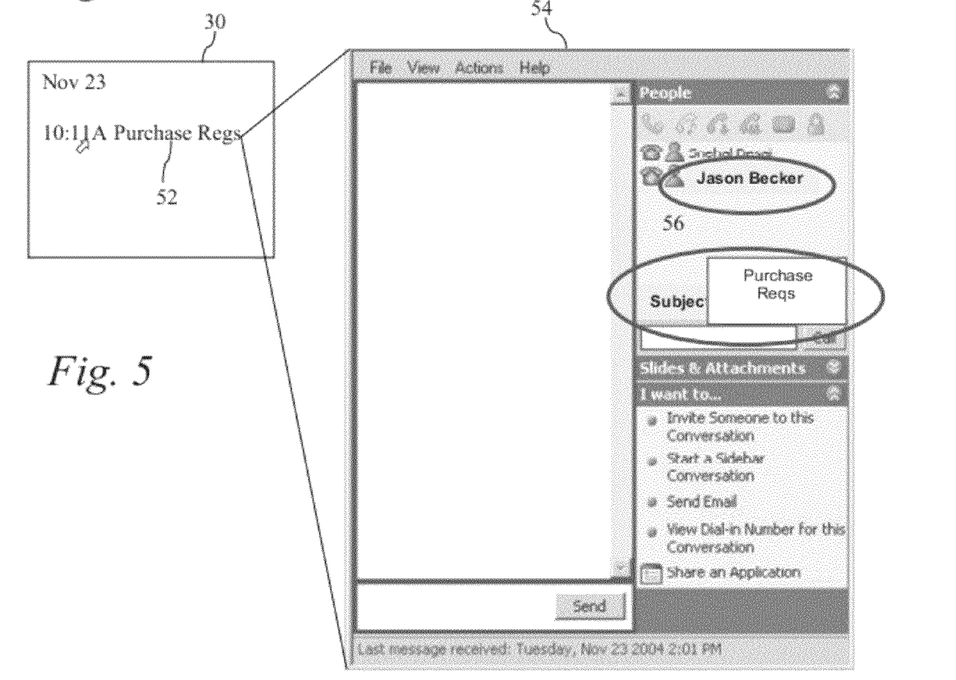
FIG. 5 illustrates an embodiment of the present invention where a user interaction with an entry in the calendar display initiates a new communication session.

FIG. 5 illustrates an embodiment of the present invention where a user interaction with an entry 52 in the calendar display 30 can initiate a new communication session. In FIG. 5, the user interacts with the entry "10:11 A Purchase Reqs", for example by double-clicking or right-clicking the entry using a graphical user interface. The action by the user invokes a communication screen 54, which takes the subject matter information (Purchase Reqs) from the entry 52 and automatically fills in the subject line of the new communication in field 54 (i.e., the communication session is context populated). The type of communication session initiated by the Calendar-centric Information Organizer 10 defaults to the type of communication session associated with the entry with which the user interacted. For the present example, the "Purchase Reqs" entry was a phone call, so the Calendar-centric Information Organizer would initiate a phone call in response to an appropriate action by the user. However, the type of communication session could be easily changed by the user. Further, the party associated with the entry 52 (Jason Becker) is selected as a party to the new communication. The remainder of the communication session can be completed by adding attachments and specifying additional parties, if desired.

This aspect of the invention provides an efficient method of initiating communication sessions based on prior communication sessions. In most cases, a single click on the calendar entry can generate the context-populated response communication session. User productivity is increased by minimizing user-interaction time and by eliminating or greatly reducing drudgery in reading communication logs.

Figure 6:
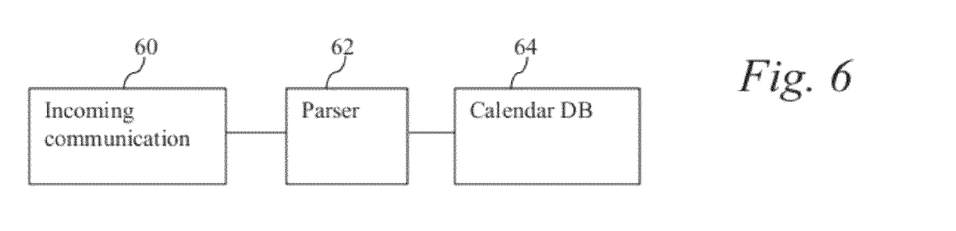
FIG. 6 illustrates a block diagram of an embodiment of the Calendar-centric Information Organizer which creates calendar scheduling entries from incoming communications.

FIG. 6 illustrates an embodiment of the Calendar-centric Information Organizer which creates calendar scheduling entries from incoming communications. An incoming communication 60 is parsed by parser 62 to determine whether it contains information that can be used to create a scheduling entry. If so, a scheduling entry is placed in the database 64 containing calendar entries (or To-do list entries, as appropriate).

In operation, the incoming communication could be a voice/video communication including a subject line, and instant/text message, or an email message. For an instant/text message or an email message, the parser could look at the entire message to determine whether it refers to an event that should be scheduled, while the subject line would be parsed for a voice communication. It would also be possible to use voice recognition techniques to create text from an ongoing voice communication, which could then be scanned for events for scheduling.

In particular, the parser would retrieve text from a communication as appropriate and look for key words such as "meet", "meeting", "mtg", "conference", "telephone conference", "lunch", "dinner", "game", and other words commonly used to refer an event that should be scheduled, and then determine whether words surrounding the key words provide enough information to schedule, or reasonably schedule, an event. For example, the text string "I'll meet you at the bus stop" would typically not meet the threshold for automatically scheduling an event, while "I'll meet you at the bus stop at 3 PM tomorrow" would be sufficient.

Figure 7:
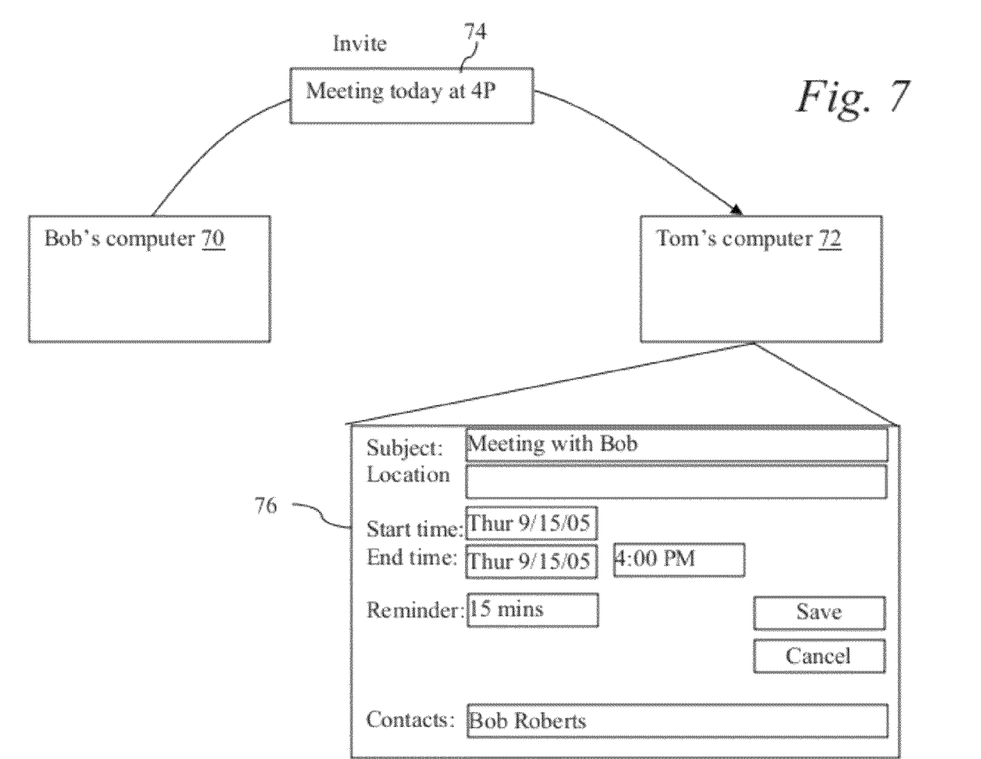
FIGS. 7, 8 and 9 illustrate examples of how the communication-related information can stored in a calendar format.
Figure 8:
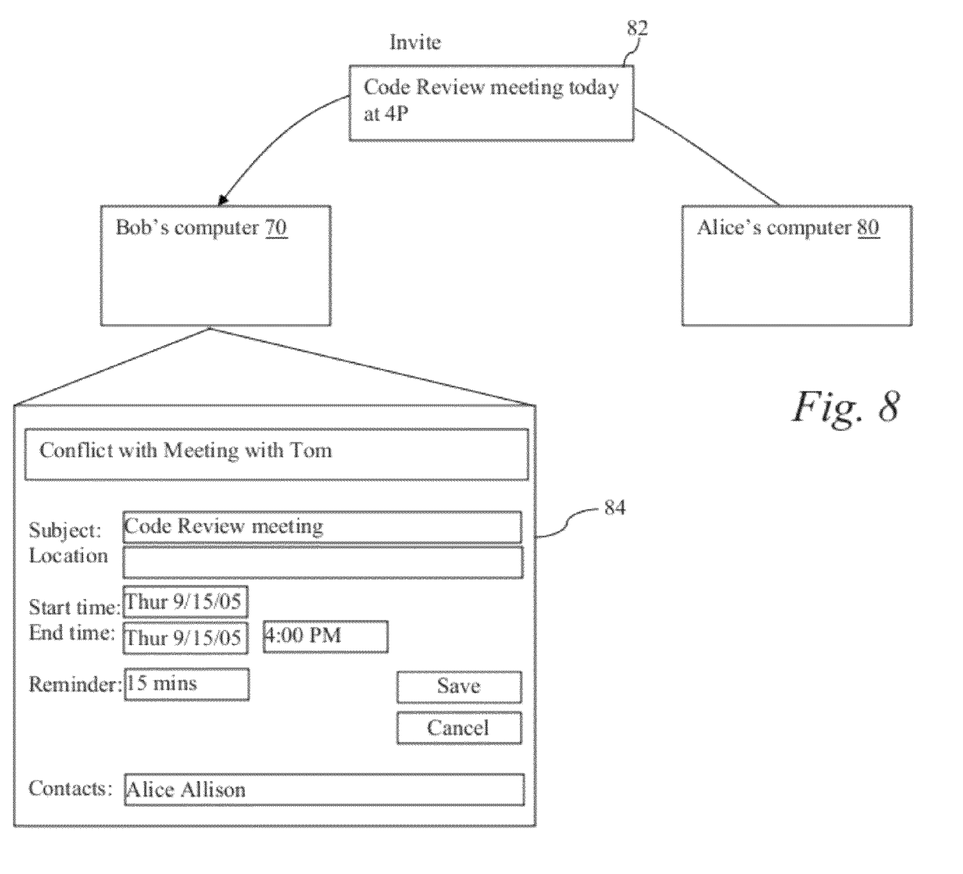
Figure 9:
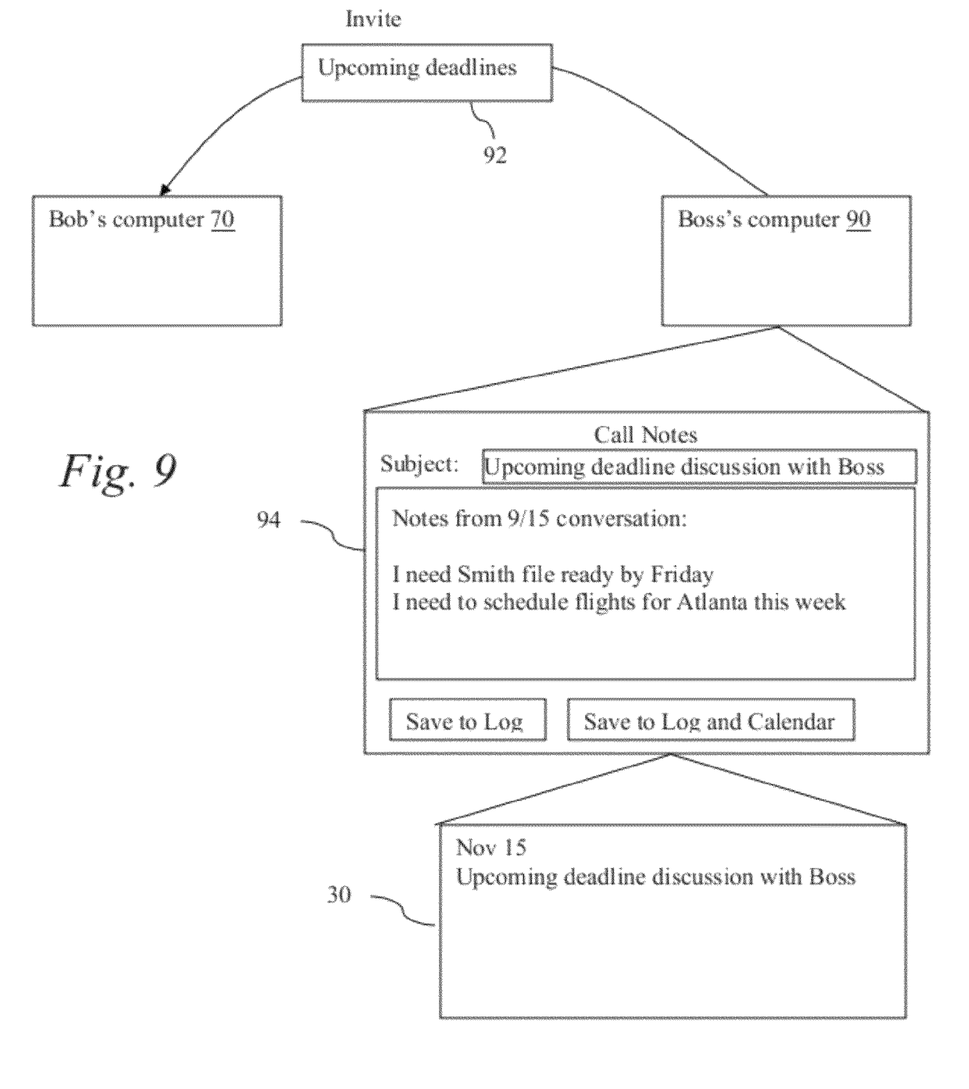

FIGS. 7, 8 and 9 illustrate examples of how the communication-related information can stored in a calendar format. In FIG. 7, a communication between Bob and Tom is initiated by Bob's computer 70 sending Tom's computer 72 an invite message 74 with the subject line "Meeting today at 4 P". The parser 62 interprets the subject line as indicative of a calendar event and automatically generates an entry 76 for the calendar program in Tom's computer, entitled "Meeting with Bob". Tom can accept the entry, modify the entry as appropriate, or cancel the entry. It should be noted that Bob's computer can also automatically generate an entry based on the outgoing subject line.

In FIG. 8, a communication between Alice and Bob is initiated by Alice's computer 80 sending Bob's computer 70 an invite message 82 with the subject line "Code Review Meeting today at 4 P". The parser 62 interprets the subject line as indicative of a calendar event and automatically generates an entry 84 for the calendar program in Bob's computer. Because this entry is in conflict with the previous appointment, a warning 86 is generated on the screen, indicating that the current entry will conflict with "Meeting with Tom". As before, Tom can accept the entry, modify the entry or cancel the entry.

While the example shown in FIGS. 7 and 8 use a voice communication to generate a calendar entry, the same could be accomplished using email or instant/text messaging.

In FIG. 9, Bob receives a call from his boss's computer 90 regarding deadlines for the project, initiated by invite message 92. Since this call is important for Bob, he takes notes during the call (in a program 94 associated with the call log) and would like the notes to be added not only to the call log, but also to his calendar program. Since Bob views his calendar more often than the call log, the call information (caller, date, time, call subject) and call notes if saved in the calendar may serve as handy reminder for Bob. The call notes program allows Bob to select whether to save the notes to the call log or to both the call log and calendar. If Bob selects to save the notes to both the log and the calendar, it will show up as a calendar entry in the calendar display 30 on the date the notes were taken.

Figure 10:
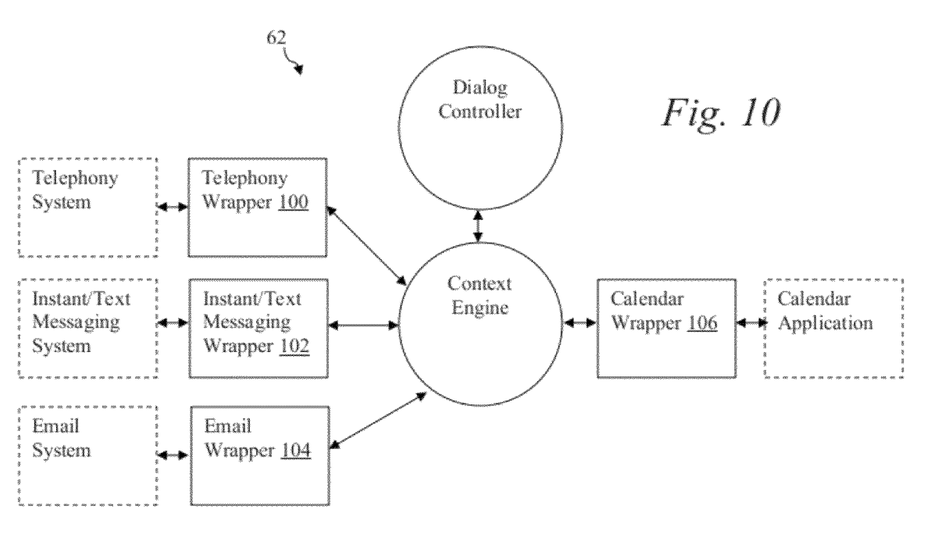
FIG. 10 illustrates a preferred embodiment for implementing the parser of FIG. 6.

FIG. 10 illustrates a preferred embodiment for implementing the parser 62. The parser 62 receives information from the various communication programs. Because information in the various communication programs will be in different forms depending upon the application program being used, telephony wrappers 100, 102, 104 and 106 translate between the parser 62 and the various application programs. Thus, telephony wrapper 100 will translate information from the telephony system to a form suitable for processing by the parser 62 and will translate information from the parser 62 into a form usable by the telephony system. Similarly, instant/text messaging wrapper 102 will translate information from the instant/text messaging system to a form suitable for processing by the parser 62 and will translate information from the parser 62 into a form usable by the instant/text messaging system. The email wrapper 104 translates information from the email system to a form suitable for processing by the parser 62 and will translate information from the parser 62 into a form usable by the email system. The calendar wrapper 106 translates information from the calendar system to a form suitable for processing by the parser 62 and will translate information from the parser 62 into a form usable by the calendar system.

A context engine 108 is coupled to the various wrappers 100-108 and to a dialog controller 110. The context engine maintains the current context of communications by the user. The context engine 108 is the core of the architecture. The context engine 108 subscribes with the various communication systems for events such as incoming call/messages/email and outgoing call/messages/email. When the context engine 108 is notified of an incoming voice call event, it queries the telephone system for the subject of the call. The context engine 108 saves the call log in the calendar with subject, time of call, any notes, and so on. It also passes the subject to the dialog controller 110 for further processing. Based on the parsed result from the dialog controller 110, the context engine 108 may decide to create a new event in the calendar, as described above. If the calendar application already has an event that conflicts with the event proposed by the context engine, the calendar application notifies the context engine 108 of the conflict and the context engine 108 passes this information to the user.

The dialog controller 110 parses the subjects of email, instant/text messages and phone calls. The dialog controller 110 determines potential calendar event types (e.g. meeting), event time and date from the subject and passes this information to the context engine. The date can be explicit (e.g., "September 15") or implicit (e.g., "next Monday"). Some communication information may not indicate that scheduling event is necessary. In this case, the dialog controller 110 informs the context engine 108 that this subject is not relevant to scheduling.

It should be noted that the various applications, telephony, email, instant/text messaging, and so on, could be third party programs, or integrated with the parser.

The present invention provides significant advantages over the prior art. First, it organizes data regarding communications in a familiar, easily accessed form. Second, it can automatically generate calendar (and to-do) events, which reduces user effort, and can prevent inadvertent non-entry of important events.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A method of generating entries for a scheduling program on a processing device, comprising:
   receiving a voice communication by the processing device;
   generating text from the voice communication using voice recognition;
   analyzing the text to determine whether the text includes predetermined key words associated with an event;
   when the text includes the predetermined key words associated with an event, determining whether the text includes sufficient information to generate an entry for the event;
   when the text includes sufficient information to generate an entry for the event, automatically creating the entry for the event; and
   storing the entry in a database for the scheduling program.

2. The method of claim 1 wherein automatically creating the entry for the event comprises:
   automatically creating a calendar entry for the event for a calendar program; and
   generating a user interface for requesting at least one of the following: accepting the calendar entry, modifying the calendar entry and canceling the calendar entry.

3. The method of claim 1 wherein automatically creating the entry for the event comprises:
   automatically creating a to-do list entry for the event.

4. The method of claim 1 wherein generating text from the voice communication using voice recognition comprises:
   interfacing with a telephony system to translate the voice communication into text with a predetermined format.

5. The method of claim 1 wherein the scheduling program includes a calendar centric information program and wherein the calendar centric information program is operable to:
   maintain the database including the entry for the event on the processing device; and
   display the event on the processing device in a calendar format.

6. The method of claim 5 wherein the calendar centric information program is operable to:
   include the voice communication in a call log; and
   display the call log on the processing device in the calendar format.

7. A processing device, comprising:
   a calendar database; and
   a parser operable to:
      receive text from a text message received by the processing device;
      determine whether the text includes predetermined key words associated with an event;
      when the text includes the predetermined key words associated with an event, determine whether the text includes sufficient information to generate an entry for the event;
      when the text includes sufficient information to generate an entry for the event, automatically create the entry for the event; and
      store the entry in the calendar database.

8. The processing device of claim 7 wherein the parser includes:
   a telephony wrapper operable to translate the text from the text message to a predetermined format for processing by the parser;
   a dialog controller operable to parse the text from the text message determine whether the text includes predetermined key words associated with an event; and
   a context engine operable to automatically create the entry for the event when the text includes sufficient information to generate an entry for the event.

9. The processing device of claim 8 wherein the context engine is further operable to receive notifications of messages received by the processing device and save a call log in the calendar database.

10. The processing device of claim 9 wherein a calendar application wrapper is operable to translate information from the parser to a calendar application.

11. The processing device of claim 10 wherein the calendar application is operable to:
   generate a user interface for requesting at least one of the following: accepting the entry for the event, modifying the entry for the event and canceling the entry for the event.

12. The processing device of claim 11 wherein the calendar application is operable to:
   display the entry for the event on the processing device in a calendar format.

13. The processing device of claim 12 wherein the calendar application is operable to:
   display the call log on the processing device in the calendar format.

14. The processing device of claim 7 wherein the parser is further operable to:
   automatically create a to-do list entry for the event.

15. A method of generating entries for a calendar-centric information organizer on a processing device, comprising the steps of:
   receiving a plurality of communications by the processing device, wherein the plurality of communications include the following types of communications: voice communication, text message and email;
   for each of the plurality of communications:
   determine whether the text includes predetermined key words associated with an event;
   when the text includes the predetermined key words associated with an event, determine whether the text includes sufficient information to generate an entry for the event;
   when the text includes sufficient information to generate an entry for the event, automatically create the entry for the event; and
   store the entry in a calendar database.

16. The method of claim 15 comprising:
   converting each of the plurality of types of communications into a predetermined format for processing.

17. The method of claim 16 wherein converting each of the plurality of types of communications into a predetermined format includes:
   interfacing with a telephony system to translate information from a voice communication into the predetermined format;
   interfacing with a text message to translate information from a text message into the predetermined format; and interfacing with an email system to translate information form an email into the predetermined format.

18. The method of claim 15 comprising:
displaying the entry in the calendar database by the processing device m a calendar format according to a date associated with the entry.

19. The method of claim 15 comprising:
generating a user interface for requesting at least one of the following: accepting the entry for the event, modifying the entry for the event and canceling the entry for the event.

20. The method of claim 15 comprising:
for each of the plurality of communications, storing a notifications of the communication received by the processing device in a call log in the calendar database; and
displaying the call log on the processing device in a calendar format.

* * * * *